United States Patent
Campbell et al.

(10) Patent No.: US 10,907,901 B2
(45) Date of Patent: Feb. 2, 2021

(54) COOLING DEVICE AND SYSTEM FOR BATHING INSTALLATION PUMP ELECTRICAL DRIVE

(71) Applicant: Balboa Water Group, Inc., Tustin, CA (US)

(72) Inventors: Graham J. Campbell, Irvine, CA (US); Gregory R. Pearly, Ladera Ranch, CA (US); Juan M. Rocha, Ontario, CA (US); Kevin G. Ross, Maple Valley, WA (US)

(73) Assignee: Balboa Water Group, LLC, Costa Mesa, CA (US)

( * ) Notice: Subject to any disclaimer, the term of this patent is extended or adjusted under 35 U.S.C. 154(b) by 101 days.

(21) Appl. No.: 16/207,624

(22) Filed: Dec. 3, 2018

(65) Prior Publication Data
US 2020/0173724 A1 Jun. 4, 2020

(51) Int. Cl.
| | |
|---|---|
| F28D 1/02 | (2006.01) |
| H02K 7/14 | (2006.01) |
| H02K 9/22 | (2006.01) |
| A61H 33/00 | (2006.01) |
| F04D 25/06 | (2006.01) |
| H02K 11/33 | (2016.01) |

(52) U.S. Cl.
CPC ........... *F28D 1/02* (2013.01); *A61H 33/6047* (2013.01); *F04D 25/06* (2013.01); *H02K 7/14* (2013.01); *H02K 9/22* (2013.01); *H02K 11/33* (2016.01); *A61H 2201/1223* (2013.01); *H02K 2211/03* (2013.01)

(58) Field of Classification Search
CPC ....... F28D 1/02; A61H 33/6047; F04D 25/06; H02K 11/33; H02K 7/14; H02K 9/22
USPC ......................................................... 4/541.3
See application file for complete search history.

(56) References Cited

U.S. PATENT DOCUMENTS

| | | | |
|---|---|---|---|
| 4,720,981 | A | 1/1988 | Helt et al. |
| 4,854,373 | A | 8/1989 | Williams |
| 5,172,754 | A | 12/1992 | Graber et al. |
| 5,863,185 | A | 1/1999 | Cochimin et al. |
| 6,080,973 | A * | 6/2000 | Thweatt, Jr. .......... F24H 9/0047 219/497 |

(Continued)

FOREIGN PATENT DOCUMENTS

| | | |
|---|---|---|
| DE | 4435511 C1 | 2/1996 |
| DE | 4435510 C1 | 3/1996 |

(Continued)

*Primary Examiner* — Tuan N Nguyen
(74) *Attorney, Agent, or Firm* — Larry K. Roberts (57) ABSTRACT

A passive cooling system for an electric motor drive circuit in a bathing installation, including a section of hollow pipe made of a thermally conductive tubing material, the pipe configured to form part of a water recirculation path of the bathing installation. An adapter structure has a conformal surface configured for attachment to an outer surface of the pipe and a circuit contacting surface for attachment to the motor drive circuit, the adapter structure fabricated of a thermally conductive adapter material. The adapter structure provides a thermal conductive path between the motor drive circuit and the pipe section, configured to pass heat generated by the circuitry to the pipe section and into spa water flowing through the water recirculation path, to cool the circuitry and warm the spa water.

14 Claims, 9 Drawing Sheets

(56) References Cited

U.S. PATENT DOCUMENTS

| | | | |
|---|---|---|---|
| 6,125,035 A | 9/2000 | Hood, III et al. | |
| 6,132,184 A | 10/2000 | Robertson et al. | |
| 6,200,108 B1 | 3/2001 | Caudill et al. | |
| 6,891,725 B2 | 5/2005 | Derksen | |
| 7,236,692 B2 | 6/2007 | Tran | |
| 7,695,613 B2 | 4/2010 | Doyle et al. | |
| 7,802,614 B2 | 9/2010 | Elnar | |
| 2006/0078444 A1 | 4/2006 | Sacher | |
| 2011/0280744 A1 | 11/2011 | Ortiz et al. | |
| 2014/0186155 A1 | 7/2014 | Tazioli et al. | |
| 2016/0348885 A1 | 12/2016 | Yang et al. | |
| 2017/0122916 A1 | 5/2017 | Leaders et al. | |

FOREIGN PATENT DOCUMENTS

| | | | |
|---|---|---|---|
| EP | 2410830 A1 | 1/2012 | |
| WO | WO2007071352 A1 | 6/2007 | |
| WO | WO2010064055 A1 | 6/2010 | |
| WO | WO2014198007 A1 | 12/2014 | |

\* cited by examiner

COOLING DEVICE AND SYSTEM FOR BATHING INSTALLATION PUMP ELECTRICAL DRIVE

BACKGROUND

Bathing installations such as spas and whirlpool baths typically employ a recirculating water path, through which water may be pumped through use of a pump. The pumps and electrical drive circuitry are typical installed under a spa skirt, along with the heater, tubing for the water flow path, and even the control system for the spa. Spa tub water can be heated to 104 F degrees. The heater and pump drive circuitry and other components generate heat during operation, so that the space within the skirt is very warm. The heat can build up, with risk of affecting operation of the electrical components within the skirt space.

In some applications, the pump motor is a variable speed pump, and the pump drive circuitry is a variable frequency drive (VFD). The VFD circuitry is typically installed on the pump housing and generates considerable heat during operation. The VFD performs power inversion from single phase to three phase, high voltage, which generates heat. The heat generated by the VFD tends to accumulate within the enclosed spa skirt space, and in some instances lead to damage to the VFD.

VFD controls mounted to the motors typically attempt to "air cool" the controls, which has not proven to be effective. The air temperature under the spa can get quite hot plus the motor is also generating heat. Customers have reported thermal tripping of these units.

Even though the spa water temperature can be 104 F there can still be a 70+ F temperature delta between the water temperature and the hot elements of the VFD circuitry.

Other attempts to water cool electronic devices have employed water cooling elements which have pierced the circuitry area, with the potential to leak water into the circuit area, or have pierced the water tube with elements protruding into the water, which can obstruct or reduce water flow.

Some other attempts to cool spa circuitry have aluminum components in contact with the water. Water will corrode the aluminum. To stop this from happening, coatings have been applied to the aluminum to prevent corrosion. This adds to the cost, and may ultimately fail.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals. The figures are not to scale, and relative feature sizes may be exaggerated for illustrative purposes.

Figure 1:
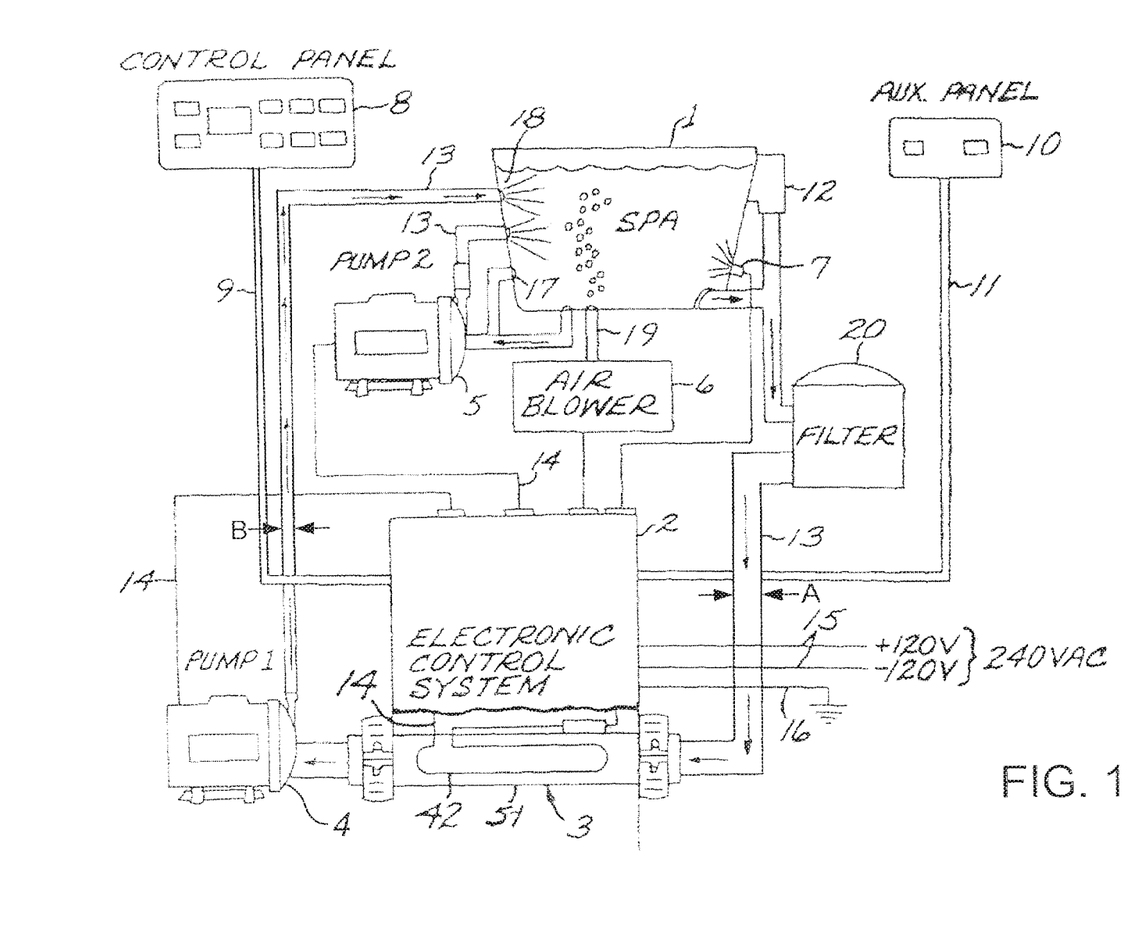
FIG. 1 is a diagrammatic schematic view illustrating a typical spa installation.

FIG. 1 illustrates an overall block diagram of an exemplary embodiment of a spa system, illustrating the operating environment. The system includes a vessel 1 for holding a volume of water, and a control system 2 to activate and manage the various parameters of the spa. Connected to the vessel 1 through a series of plumbing lines 13 are electric motor-driven pumps 4 and 5 for pumping water, a skimmer 12 for cleaning the surface of the vessel, a filter 20 for removing particulate impurities in the water, an air blower 6 for delivering therapy bubbles to the vessel through air pipe 19, and an electric heater 3 for maintaining the temperature of the spa at a temperature set by the user. In an exemplary embodiment, the electric heater 3 includes one or more resistive heating coils or elements 42 and a heater shell 51. In an exemplary embodiment, the heater shell 51 may comprise stainless steel. In exemplary embodiments, the heating elements may be wet or dry. In FIG. 1, the heating elements are shown in the fluid flow path. In other embodiments, the heating elements may be arranged in a dry portion of a heater 3. Generally, a light 7 is provided for internal illumination of the water. While the exemplary embodiment shown in FIG. 1 includes two pumps with respective water recirculation paths, some spa systems may omit the second pump and its associated water recirculation path.

Service voltage power is supplied to the spa control system at electrical service wiring 15, which can be 120V or 240V single phase 60 cycle, 220V single phase 50 cycle, or any other generally accepted power service suitable for commercial or residential service. An earth ground 16 is connected to the control system and there through to all electrical components which carry service voltage power and all metal parts. Electrically connected to the control system through respective cables 9 and 11 are the control panels 8 and 10. All components powered by the control system are connected by cables 14 suitable for carrying appropriate levels of voltage and current to properly operate the spa. Water is drawn to the plumbing system generally through the skimmer 12 or suction fittings 17 and discharged back into the vessel through therapy jets 18.

Now assume that pump 1 is a variable speed pump, referenced as pump 4A in the following discussion. The pump 4A includes a variable speed electric motor. In accordance with aspects of the invention, the VFD circuitry for pump 4A is installed in a housing separate from the pump and integrated with an adapter structure and a thermally conductive pipe section installed in the water recirculation path. The resultant VFD system is installed in the water recirculation path, either downstream or upstream from the pump itself. Heat generated by the VFD circuitry installed in the housing is conducted through the housing base, to the adapter, and then through the pipe section into the water flowing through the pipe section. The system thus provides dual advantages of providing cooling to the VFD circuitry and heating the spa water, thereby reducing the heat load to be served by the spa heater. In this embodiment, the VFD circuitry is isolated from the water cooling and the water cooling tube of the cooling system is free of any piercings, thus eliminating the opportunity of water leakage. No cooling system elements protrude into the water flow, so flow is unrestricted.

Figure 2:
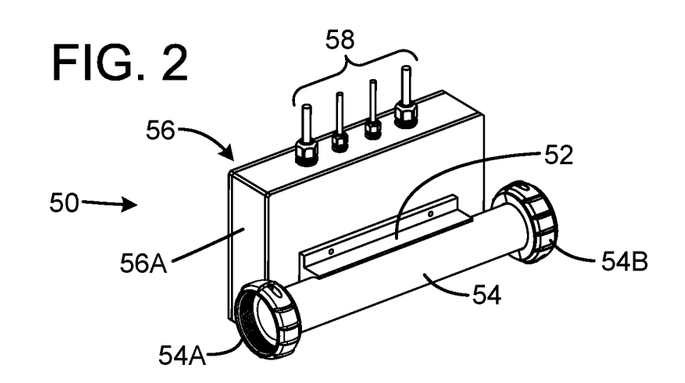
FIG. 2 is an isometric view of an exemplary embodiment of a VSD drive system in accordance with aspects of the invention.
Figure 3A:
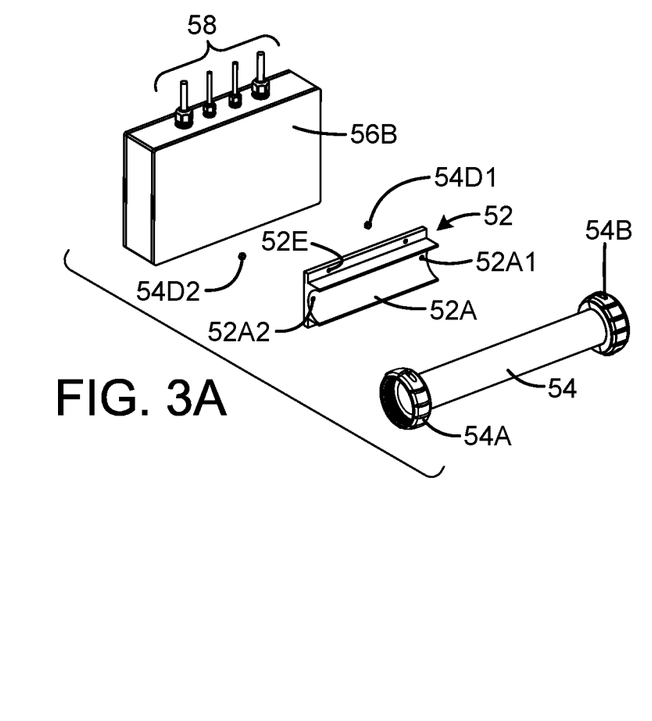
FIGS. 3A and 3B are exploded views of the VFD drive system of FIG. 2.
Figure 3B:
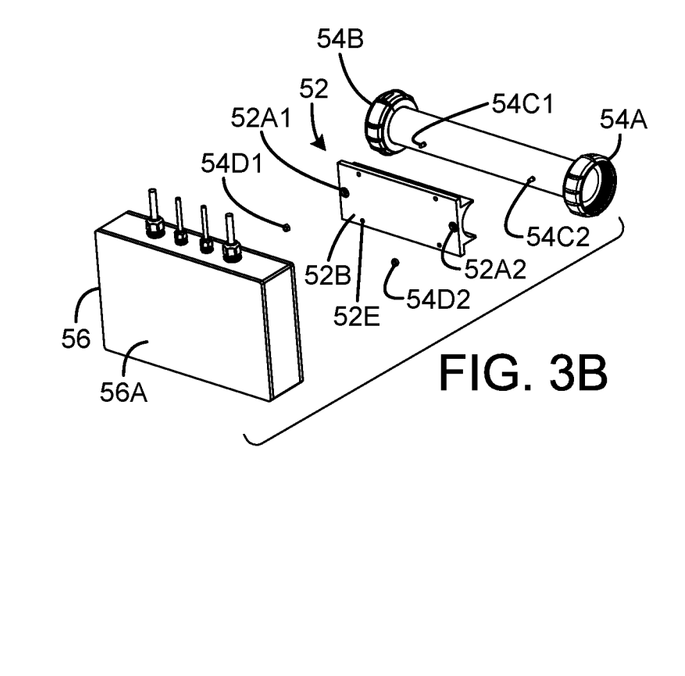

FIGS. 2, 3A and 3B are isometric views illustrating an exemplary embodiment of a VFD system 50. The system includes an adapter structure 52, a pipe section 54 and the VFD drive circuitry 56 enclosed in housing 56A. In an exemplary embodiment the pipe section 54 may be a stainless-steel cylindrical tube section, much like the stainless-steel tube section enclosing the heater element 42. Other thermally conductive tube materials may alternatively be used, such as aluminum, brass, or thermally conductive plastics. Couplers 54A, 54B are attached at opposite ends of the tube section, to connect to tubing forming part of the water recirculation path.

The adapter structure 52 is shown in further detail in FIGS. 3A and 3B. The adapter structure includes a curved, conformal surface 52A, which conforms to the outer surface of the pipe section 54. In this case, since the pipe section is cylindrical, the conformal surface 52A describes a partial cylindrical surface. In this example, the partial cylindrical surface circumscribes less than 180 degrees of the full cylinder, so that it may be moved radially into contact with the outer surface of the pipe section. In an exemplary embodiment, the adapter is secured to the pipe 54 by threaded studs 54C1, 54C2 welded to the outer surface of the pipe, which pass through openings 52A1 and 52A2 of the adapter and are secured by nuts 54D1, 54D2. The openings 52A-1 and 52A-2 are counter-sunk below the surface 52B so that the nuts can be secured below the surface 52B, so that they do not interfere with contact between surfaces 52B and 56B. A thermal paste may be applied to the conformal surface 52A before the adapter is secured to the pipe, to improve the heat transfer between the adapter and the pipe. It is preferred that the studs be welded to the outside of the pipe, rather than pass through the pipe and require seals to prevent risk of leakage. Other attachment structures for attaching the pipe section 54 to the adapter structure 52 which avoid the need for piercing the pipe may alternatively be employed, such as hose-type worm clamps, thermally conductive adhesives or the like.

The adapter structure 52 includes a flat panel 52B, opposite from the conformal surface 52A, and is assembled to the flat panel 56B of the housing 56A for the VFD drive. Threaded fasteners may be passed through openings 52E and 52E (FIGS. 3A, 3B) and corresponding holes in the flat panel 56B to secure the adapter to the housing 56A. Thermally conductive paste may be applied to the surface 56B to improve the heat transfer between the housing and the adapter.

The housing 56A for the VFD circuitry includes the panel 56B which is configured for attachment to the flat surface 52B of the adapter structure. Panel 56B is fabricated of a thermally conductive material, such as aluminum, stainless steel or thermally conductive plastic. A circuit board carrying the VFD circuit components may be attached to the inside surface of panel 56B, so that heat produced by the circuit components is conducted through the panel 56B to the adapter structure 52. The VFD drive circuitry 56 includes wiring 58 extending through ports in the housing 56A, for connection to the electronic control system 2 and to the pump 4A. The control system 2 provides single phase line voltage and control signals to the VFD circuitry through the wiring connections, and the VFD circuitry is also connected through wiring connections to the pump 4A, to provide the drive power for the pump. The VFD circuitry provides three phase power to the pump motor in this exemplary embodiment, as well as a thermal switch control signal.

Figure 4A:
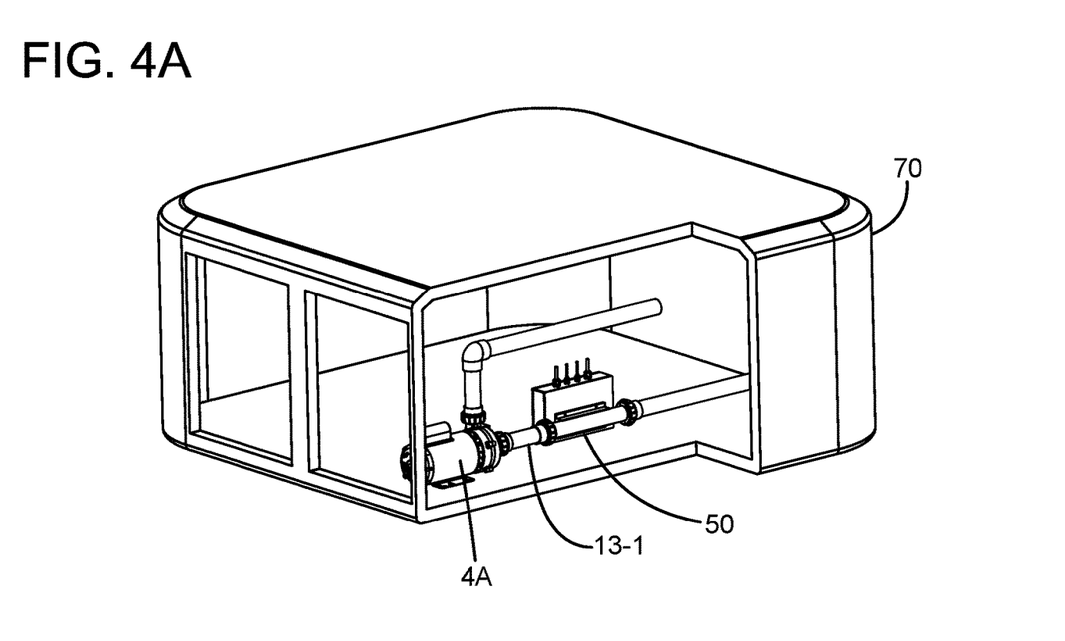
FIGS. 4A and 4B are respective isometric and side broken-away view of a spa housing, with the VFD drive system of FIG. 2 installed in the water recirculation path on the suction side of the pump.
Figure 4B:
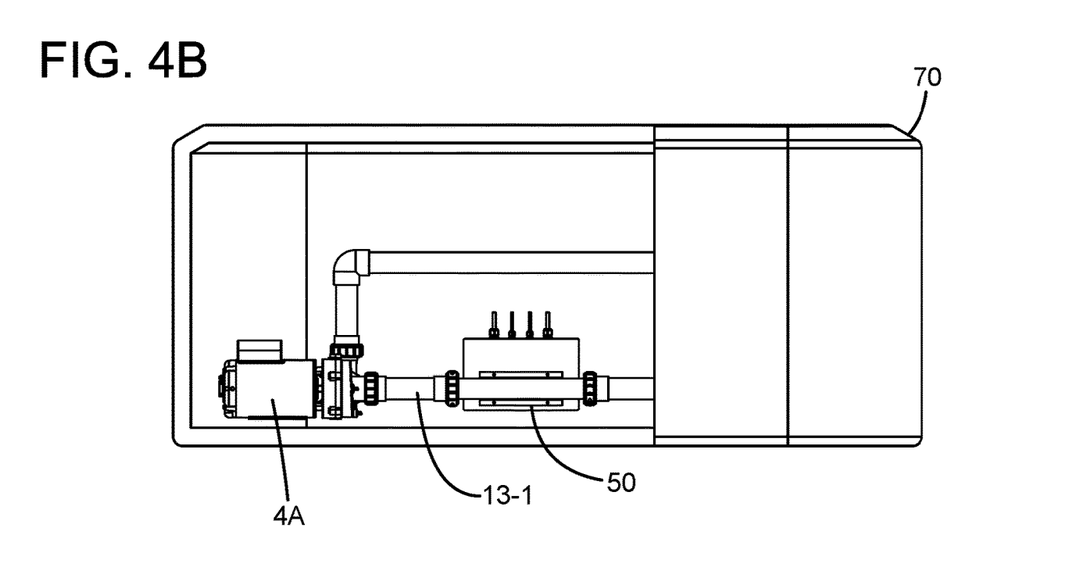

The VFD system 50 can be installed in a spa system in the water recirculation path on either the upstream or suction side, or the downstream or pressure side of the pump. FIGS. 4A-4B are cutaway isometric and side views of the system 50 installed in a spa system on the suction side of the variable speed pump 4A. Here, the spa system is generally housed within a spa housing 70, shown in cutaway fashion in FIGS. 4A, 4B. The system 50 may be inserted into the water recirculation path upstream of the pump 4A, at the area indicated by arrows A (FIG. 1), for example. The system 50 is connected to suction side pipe 13-1 in this example. For clarity, the other components of the spa system are not shown in FIGS. 4A-4B.

The spa water is typically heated to a maximum spa temperature of 104 F, while the VFD circuitry generates considerable heat to drive the pump, so that the circuitry components can be much warmer than 104 F, e.g. 170 F degrees or higher. The cooling system is configured to conduct heat from the circuit components through the housing panel surface to the adapter, and to the pipe section. With the pump in operation, spa water flows through the recirculating water path. This water flow will cool the pipe section to essentially that of the water, drawing heat from the adapter and the circuit components. The system 50 thus has the dual properties of cooling the VFD circuitry while heating the spa water, which may decrease the need for the spa controller to call for heat from the heater. The heater typically does not function when the pump is running at high speed, due to electrical current limitations. Heat can be input into the spa water with the pump operated at high speed, due to the heat transfer from the VFD through the adapter.

Figure 5A:
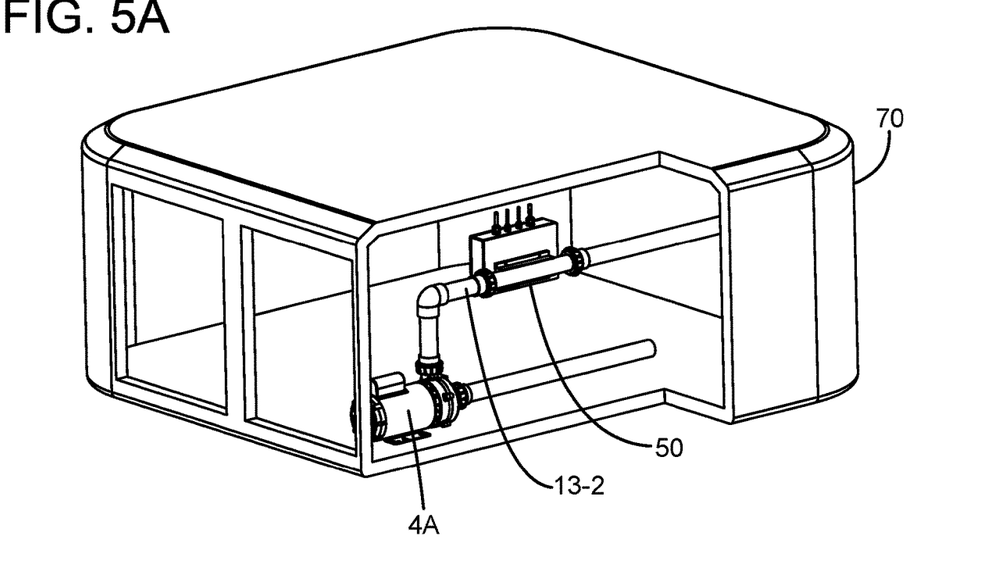
FIGS. 5A and 5B are respective isometric and side broken-away view of a spa housing, with the VFD drive system of FIG. 2 installed in the water recirculation path on the pressure side of the pump.
Figure 5B:
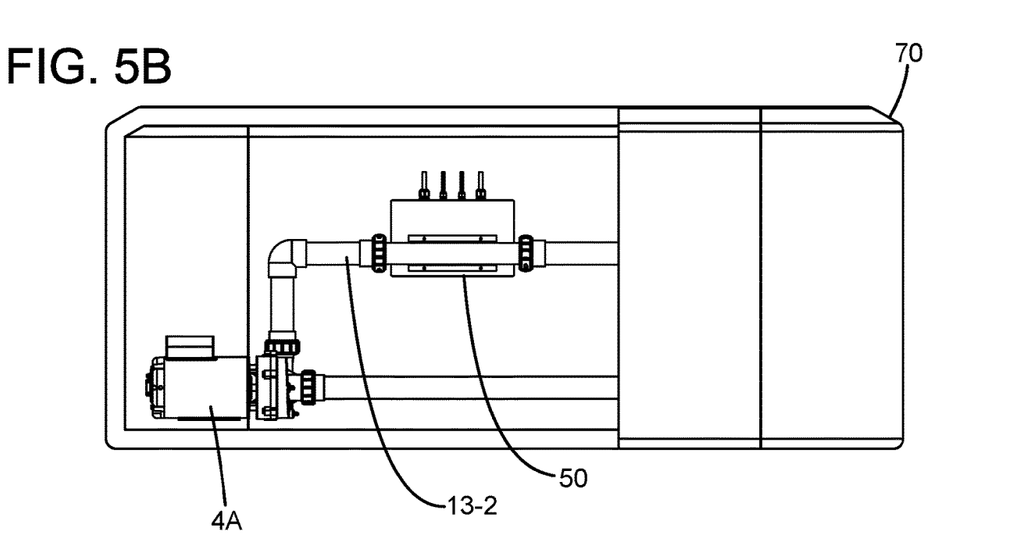

FIGS. 5A-5B illustrate an installation of the system 50 in the water recirculation path on the pressure side of the variable speed pump 4A in a spa housing 70. The system 50 may be inserted in the water recirculation path at an area indicated by arrows B (FIG. 1), for example. The system 50 is connected to pressure side pipe 13-2 in this example. For clarity, the other components of the spa system are not shown in FIGS. 5A-5B.

Figure 6:
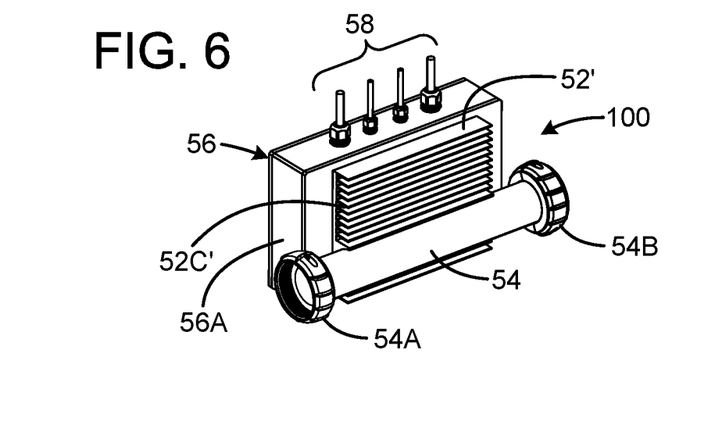
FIG. 6 is an isometric view of an alternate embodiment of a VFD drive system in accordance with aspects of the invention.
Figure 7A:
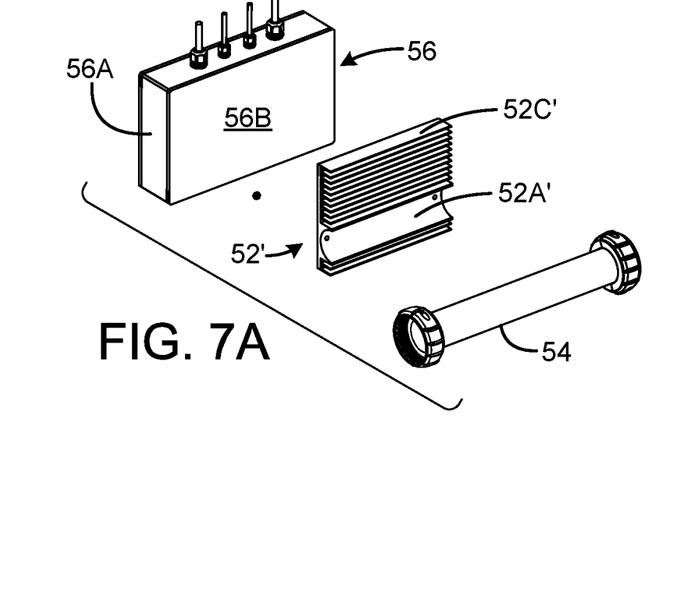
FIGS. 7A and 7B are exploded views of the VFD drive system of FIG. 6.
Figure 7B:
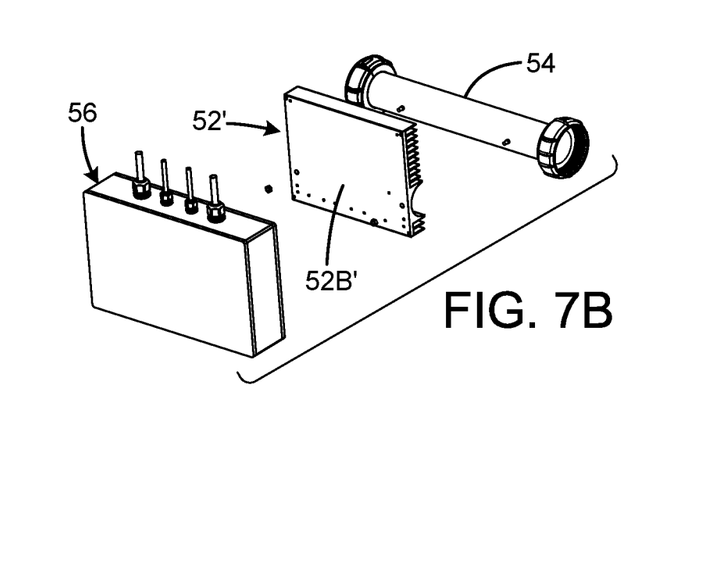

FIGS. 6, 7A and 7B illustrate an alternate embodiment of an adapter structure 52' in a VFD system 100. The adapter 52' includes a conformal surface 52A' as with the first embodiment 52, but also includes cooling fins 52C' to provide additional cooling. The adapter structure 52' includes a planar back surface 52B' which fits against the panel 56B of the housing structure 56A. The pipe or tube section 54 and the VFD drive circuitry 56 and housing 56A may be the same as in the first embodiment.

Figure 8A:
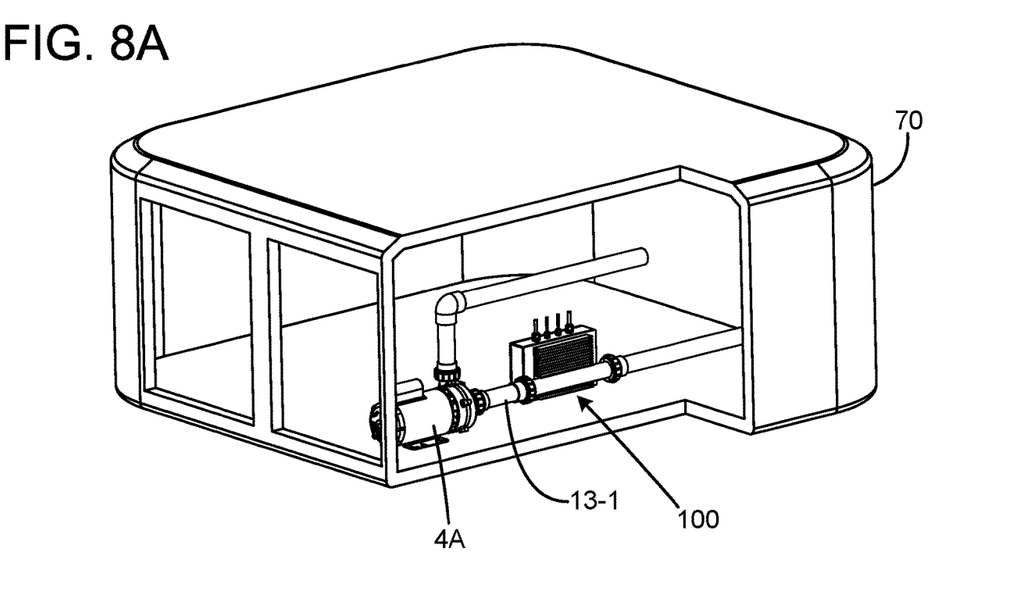
FIGS. 8A and 8B are respective isometric and side broken-away view of a spa housing, with the VFD drive system of FIG. 6 installed in the water recirculation path on the suction side of the pump.
Figure 8B:
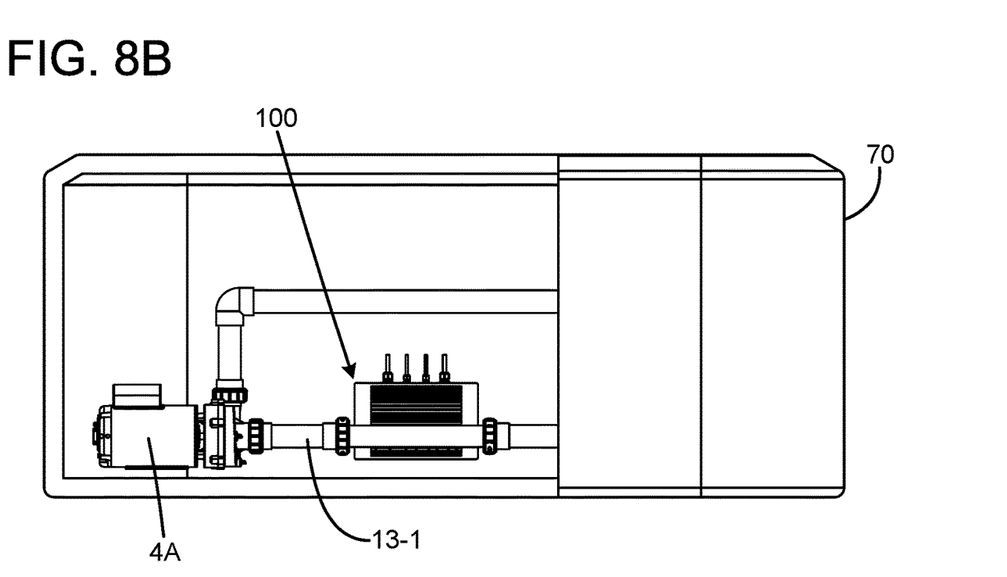
Figure 9A:
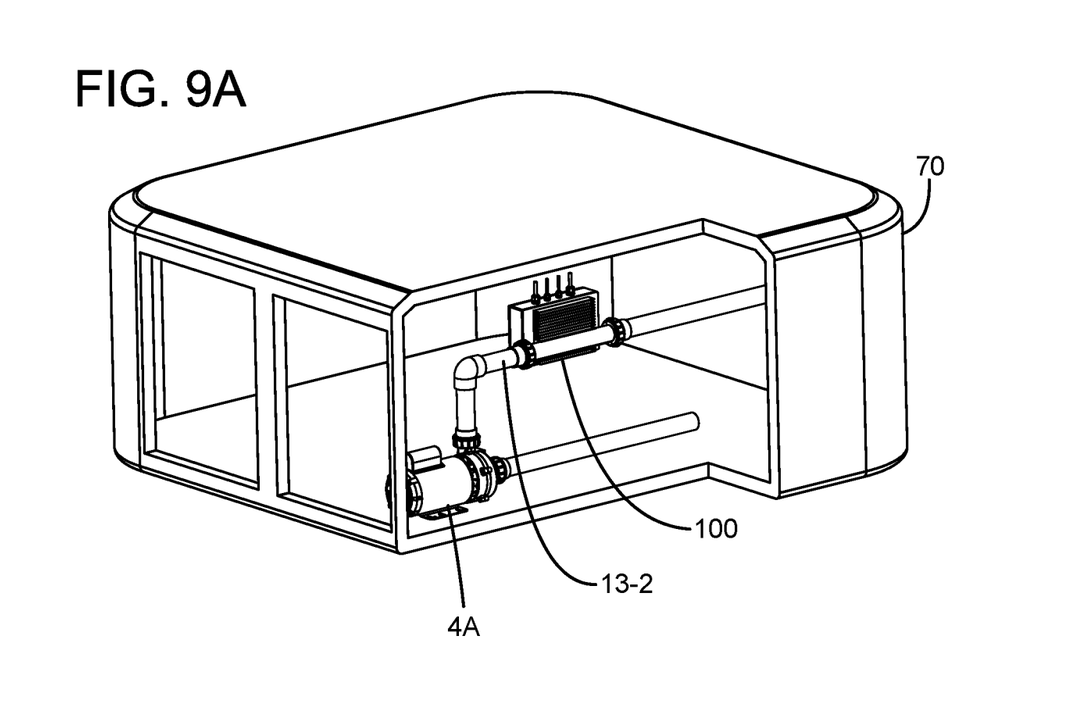
FIGS. 9A and 9B are respective isometric and side broken-away view of a spa housing, with the VFD drive system of FIG. 6 installed in the water recirculation path on the pressure side of the pump.
Figure 9B:
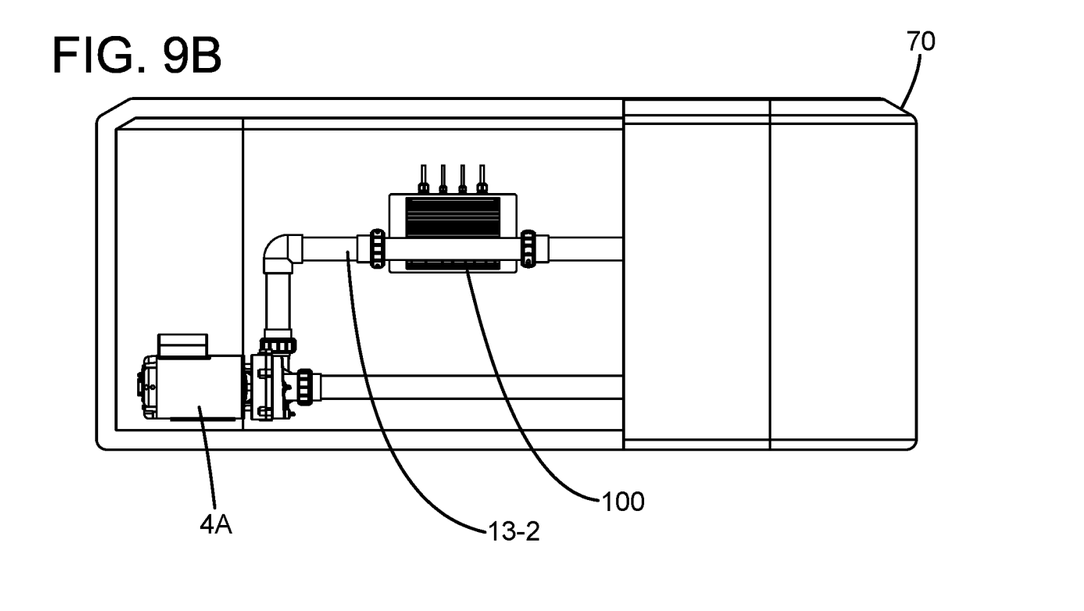

As with the first embodiment, the VFD drive system 100 can be placed in the water recirculation path either on the pump suction side or the pump pressure side. FIGS. 8A-8B show the VFD drive system 100 installed in the water recirculation path and connected to suction side pipe 13-1. FIGS. 9A-9B show the VFD drive system installed in the water recirculation path and connected to pressure side pipe 13-2.

Figure 10:
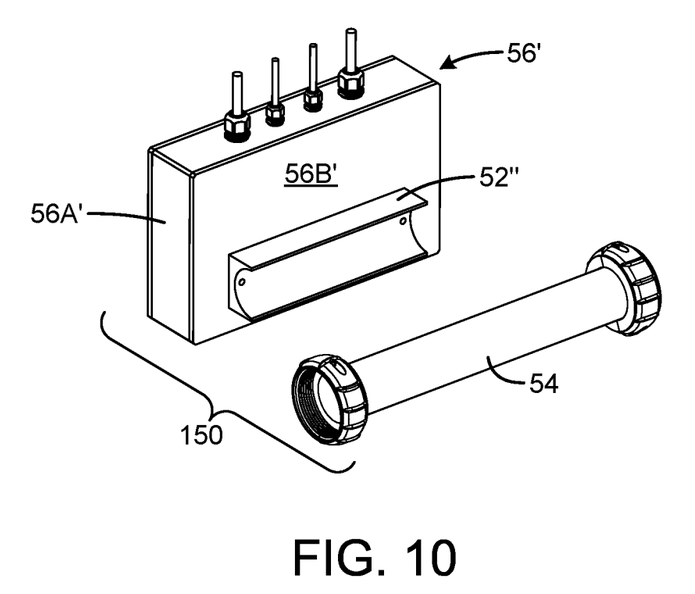
FIG. 10 is an exploded view of another embodiment of a VFD system in accordance with aspects of the invention.

FIG. 10 shows yet another exemplary embodiment of a VFD system 150. The adapter structure 54" of the VFD 56' in this embodiment is fabricated as a unitary structure with the surface 56' of the housing 56A1. The adapter structure 54" may be molded or extruded with the surface 56'. Exemplary materials for the unitary structure are aluminum and a thermally conductive plastic material. The pipe section 54 may be attached to the unitary structure by studs as in the embodiment of FIGS. 2 and 3A-3B, by a thermally conductive epoxy, by worm gear or other clamps, or the like.

Figures 11A, 11B, 11C:
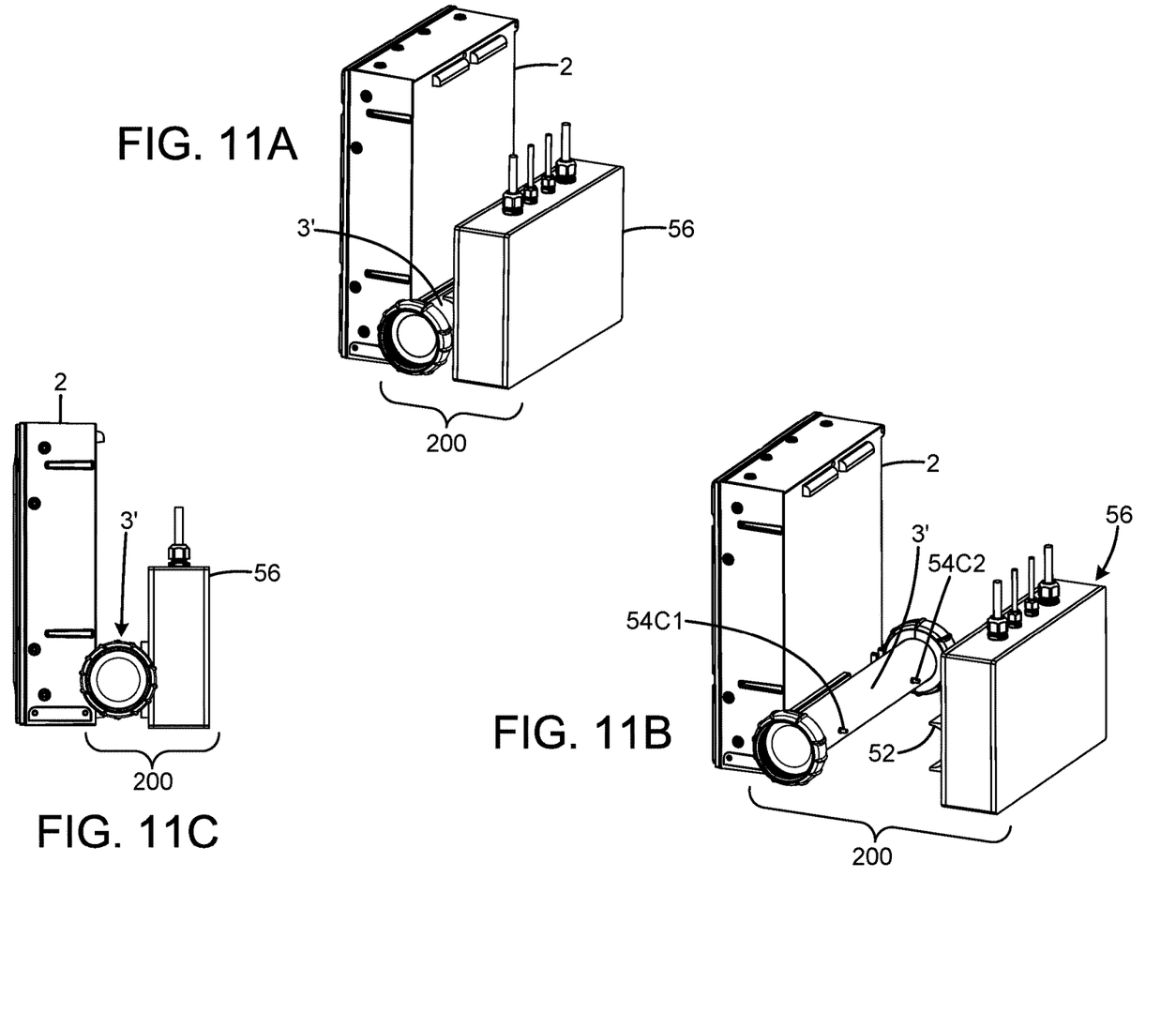
FIG. 11A is an isometric view of an alternate embodiment of a drive system in which the pipe section is shared with the heater and controller of the bathing installation.
FIG. 11B is a partially exploded view.
FIG. 11C is an end view.

FIGS. 11A, 11B and 11O depict a further embodiment of a drive circuit system 200, in which the pipe section is shared with the heater and controller. In this embodiment, one side of the pipe section 3' is attached to the controller 2 (see also FIG. 1), with the heater element 42 (FIG. 1) disposed in the pipe section. In this embodiment, the adapter structure 52 is fitted to the opposite of the pipe section 3' from the controller 2, by studs 52C1, 54C2, as with the embodiment of FIGS. 2, 3A and 3B. The VFD 56 is secured to the adapter structure 52 as with the embodiment 50 of FIG. 2. While the heater will heat the water passing through the pipe section 3', with the system 56 generating considerable heat, the water pumped through the pipe will still provide significant cooling to the drive circuitry.

Although the foregoing has been a description and illustration of specific embodiments of the subject matter, various modifications and changes thereto can be made by persons skilled in the art without departing from the scope and spirit of the invention.

What is claimed is:

1. A motor drive circuit system in a bathing installation including a variable speed pump motor, comprising:
    a length of hollow pipe or tubing made of a thermally conductive pipe material, the pipe configured to form part of a water recirculation path of the bathing installation;
    a motor drive circuit for the pump motor, comprising a housing and variable frequency drive (VFD) circuitry disposed within the housing, the housing including a panel fabricated of a thermally conductive panel material, the panel attached to or integrally formed with the circuit contacting surface of the adapter;
    an adapter structure having a conformal surface configured for attachment to an outer surface of the pipe and a circuit contacting surface for attachment to the motor drive circuit, the adapter structure fabricated of a thermally conductive adapter material;
    wherein the hollow pipe has a circular cross-sectional configuration, and the conformal surface has an arc-shaped cross-section conforming to a portion of an outer surface of the hollow pipe, and the circuit contacting surface includes a planar surface; and
    wherein the adapter structure provides a thermal conductive path between the motor drive circuit and the pipe section, configured to pass heat generated by the VFD circuitry to the pipe section and into water flowing through the water recirculation path, to cool the VFD circuitry and warm the water.

2. The system of claim 1, wherein the thermally conductive pipe material is a stainless steel.

3. The system of claim 1, wherein the thermally conductive adapter material is aluminum, copper, bronze or a thermally conductive plastic material.

4. The system of claim 1, wherein the adapter structure is attached to the hollow pipe by studs extending from an outer surface of the hollow tubing.

5. The system of claim 1, further comprising an attachment structure for attaching the adapter structure to the hollow tubing without piercing the hollow tubing.

6. The system of claim 5, wherein the attachment structure comprises one of a plurality of studs extending from an outer surface of the hollow pipe, a thermally conductive epoxy, or a clamp device.

7. The system of claim 1, wherein the part of the water recirculation path is on the pump suction side of the path.

8. The system of claim 1, wherein the part of the water recirculation path is on the pump pressure side of the path.

9. The system of claim 1, wherein the hollow pipe includes couplers attached at each end of the pipe to connect the hollow pipe into the water recirculation path.

10. The system of claim 1, wherein the adapter structure and the housing panel are fabricated as a unitary structure.

11. The system of claim 1, wherein the bathing installation further comprises a controller, and a water heater element disposed in said hollow pipe and connected to the controller, the controller affixed to the pipe.

12. An electric motor drive circuit system in a bathing installation including a pump motor, comprising:
    a length of hollow pipe or tubing made of a thermally conductive pipe material, the pipe configured to form part of a water recirculation path of the bathing installation;
    a motor drive circuit for the pump motor, comprising a housing and drive circuitry disposed within the housing, the housing including a panel fabricated of a thermally conductive panel material, the panel attached to or integrally formed with the circuit contacting surface of the adapter;
    an adapter structure having a conformal surface configured for attachment to an outer surface of the pipe and a circuit contacting surface for attachment to the motor drive circuit, the adapter structure fabricated of a thermally conductive adapter material;
    wherein the hollow pipe has a circular cross-sectional configuration, and the conformal surface has an arc-shaped cross-section conforming to a portion of an outer surface of the hollow pipe, and the circuit contacting surface includes a planar surface;
    an attachment structure for attaching the adapter structure to the hollow tubing without piercing the hollow tubing; and
    wherein the adapter structure provides a thermal conductive path between the motor drive circuit and the pipe section, configured to pass heat generated by the drive circuitry to the pipe section and into bathing installation water flowing through the water recirculation path, to cool the drive circuitry and warm the bathing installation water.

13. The system of claim 12, wherein the attachment structure comprises a plurality of studs extending from an outer surface of the hollow pipe.

14. The system of claim 12, wherein the attachment structure comprises a thermally conductive epoxy or a clamp device.

* * * * *